United States Patent
De-Kermadec et al.

(10) Patent No.: US 12,449,330 B2
(45) Date of Patent: Oct. 21, 2025

(54) METHOD FOR CHARACTERIZING A TIRE IN TERMS OF UNIFORMITY

(71) Applicant: COMPAGNIE GENERALE DES ETABLISSEMENTS MICHELIN, Clermont-Ferrand (FR)

(72) Inventors: Christophe De-Kermadec, Clermont-Ferrand (FR); Damien Lim, Clermont-Ferrand (FR); Anthony Chanseaume, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 313 days.

(21) Appl. No.: 18/014,778

(22) PCT Filed: Jul. 6, 2021

(86) PCT No.: PCT/FR2021/051251
§ 371 (c)(1),
(2) Date: Jan. 6, 2023

(87) PCT Pub. No.: WO2022/008841
PCT Pub. Date: Jan. 13, 2022

(65) Prior Publication Data
US 2024/0241014 A1    Jul. 18, 2024

(30) Foreign Application Priority Data
Jul. 7, 2020   (FR) .................................... 2007160

(51) Int. Cl.
*G01M 17/02*    (2006.01)
*G01B 5/06*    (2006.01)
(Continued)

(52) U.S. Cl.
CPC ........... *G01M 17/027* (2013.01); *G01B 5/068* (2013.01); *G01B 5/207* (2013.01);
(Continued)

(58) Field of Classification Search
CPC .. G01M 17/021; G01M 17/027; G01B 5/068; G01B 5/207; G01B 11/0691; G01B 11/245; G01B 11/2522
See application file for complete search history.

(56) References Cited

U.S. PATENT DOCUMENTS

| | | | |
|---|---|---|---|
| 7,051,583 B2 | 5/2006 | Maleo et al. | |
| 8,743,378 B2* | 6/2014 | Kaneko | G01B 11/08 356/625 |

(Continued)

FOREIGN PATENT DOCUMENTS

| | | | | |
|---|---|---|---|---|
| DE | 4232201 A1 * | 3/1994 | ............ | B60C 25/00 |
| EP | 2549225 A1 | 1/2013 | | |

(Continued)

OTHER PUBLICATIONS

International Search Report dated Sep. 30, 2021, in corresponding PCT/FR2021/051251 (5 pages).

*Primary Examiner* — Jill E Culler
(74) *Attorney, Agent, or Firm* — VENABLE LLP

(57) ABSTRACT

A device (20) for characterizing a tire (10) in terms of uniformity comprises: a frame (22), a rotary support (24) mounted with the ability to rotate relative to the frame (22) and on which the tire (10) is placed and which is intended to be set in rotation at low speed, at least two geometric measuring members (28a, 28b) secured to the frame (22) and positioned respectively in such a way as to measure the internal geometry and the external geometry of the tire (10) simultaneously as the rotary support (24) rotates, a measuring member (29) for measuring the angular position of the rotary support (24) secured to the frame (22), and an (Continued)

electronic control unit (30) configured to retrieve the variations in the internal and external geometry of the tire for each angular position of the rotary support.

7 Claims, 2 Drawing Sheets

(51) Int. Cl.
  *G01B 5/207* (2006.01)
  *G01B 11/06* (2006.01)
  *G01B 11/245* (2006.01)
  *G01B 11/25* (2006.01)
(52) U.S. Cl.
  CPC ........ *G01B 11/0691* (2013.01); *G01B 11/245* (2013.01); *G01B 11/2522* (2013.01); *G01M 17/021* (2013.01)

(56) References Cited

U.S. PATENT DOCUMENTS

| | | |
|---|---|---|
| 9,175,952 B2 | 11/2015 | Mizutani et al. |
| 9,310,278 B2 | 4/2016 | Sukegawa |
| 9,778,032 B2 | 10/2017 | Flament et al. |
| 2004/0103993 A1 | 6/2004 | Maleo et al. |
| 2013/0002856 A1 | 1/2013 | Mizutani et al. |
| 2013/0253686 A1 | 9/2013 | Flament et al. |
| 2015/0002847 A1 | 1/2015 | Sukegawa |

FOREIGN PATENT DOCUMENTS

| | | | |
|---|---|---|---|
| EP | 2799848 A1 | 11/2014 | |
| FR | 2825664 A1 | 12/2002 | |
| JP | 2006-290290 A | 10/2006 | |
| JP | 2008-196881 A | 8/2008 | |
| KR | 2016126778 A | * 11/2016 | ............. G01B 11/24 |
| WO | 2012/074527 A1 | 6/2012 | |

* cited by examiner

METHOD FOR CHARACTERIZING A TIRE IN TERMS OF UNIFORMITY

BACKGROUND

The present invention relates to the field of tyres, notably for vehicles.

More particularly, the invention relates to a device for characterizing a tyre in terms of uniformity.

What is meant by "uniformity" is all the possible deviations between an actual tyre and an ideal tyre, the reference model thereof. These are all the local variations or irregularities of this actual tyre in terms of mass, geometric or stiffness characteristics.

Uniformity defects are generally caused by imperfections introduced by the manufacturing methods. Most cannot be measured directly but are measured through the effects they cause.

As the tyres rotate, the uniformity defects present in the structure of the tyre produce variations in the forces along the wheel axis. These defects become significant when these variations in force are transmitted in the form of noticeable vibrations to the vehicle and to the occupants of the vehicle.

It is known practice to detect defects in geometry, stiffness and static and dynamic out-of-balances by setting an inflated tyre in rotation at a low rotational speed.

However, such measurements taken at low speed by uniformity measuring machines known as "low speed uniformity devices" do not make it possible to anticipate all of the dynamic loads (forces and moments) at high speeds.

Specifically, when the tyre is running at high speed, for example when the vehicle is driving on an expressway, at speeds in excess of 80 km/h, the crown of the tyre is subjected to a significant centrifugal force. The defects in geometry are then accentuated, notably when masses are localized at the crown of the tyre, these will give rise to localized deformations of the tyre. These deformations produced by the increase in speed cannot be predicted by the measurements taken by the known low-speed devices. However, such defects by contrast produce significant effects that the tyre has on the wheel centre and therefore on the vehicle.

Devices configured to measure dynamic loads at high speed, known as "high-speed uniformity devices" have therefore been developed for detecting the high-speed effects of the defects in the uniformity of a tyre. The measurements taken are representative of the excitations to which the tyre subjects the vehicle when the vehicle is running at high speed, for example in excess of 80 km/h.

However, such devices are particularly expensive and difficult to implement. Moreover, the measurements taken by such devices are difficult to exploit in order to get back to their causes: combination of all the effects, dynamic amplification, modal behaviour of the tyre, etc.

Measurement devices that operate at high speed are therefore more difficult to design and to use, on the one hand, and, on the other hand, it is particularly difficult to exploit the measurements obtained: the loads recorded are the combined effects of all the causes and it is necessary to know how to distinguish between these causes.

There is therefore still a need to offer a device for characterizing a tyre in terms of uniformity that is simple in design and the measurements taken by which are easy to interpret.

SUMMARY

One subject of the present invention is a device for characterizing a tyre in terms of uniformity, the crown of the tyre containing welded metal parts, the device comprising a frame, a support mounted with the ability to rotate relative to the frame and intended to accept the tyre that is to be characterized. The rotary support is intended to be set in rotation at low speed.

What is meant by "low speed" is a rotational speed of the rotary support that is less than or equal to around 20 rpm.

The device further comprises a measuring member for measuring the angular position of the rotary support secured to the frame and fixed, by way of nonlimiting example, under the rotary support.

The device further comprises at least two measuring members secured to the frame and positioned respectively in such a way as to measure or detect, for each angular position of the rotary support, the internal-surface geometry and the external-surface geometry of the tyre simultaneously as the rotary support rotates.

The device comprises an acquisition module for acquiring the signals pertaining to the surface geometry of the tyre coming from the measuring members.

In this way, the surface geometry of the tyre that is to be characterized can be detected using a characterization device comprising a tyre support that is capable of being set in rotation at low speed.

Advantageously, the electronic control unit comprises a module for determining variations in the thickness of the tyre for each angular position of the rotary support and, notably, across the width of said tyre, on the basis of the internal-surface geometry and external-surface geometry signals.

According to one embodiment, the electronic control unit comprises a module for converting said thickness variations into variations in mass as a function of a predetermined mean density of said tyre, the conversion module being configured to detect defects in the welds of the metal parts of the crown of the tyre and apply a predetermined different density to these.

The tyre is made mainly of rubber and the mean density of rubber is comprised between 0.92 and 0.99. However, the crown also contains plies made up of metal cords assembled by rubber films, the density of which assembly is of the order of 3 to 5. The localized masses are, for the most part, due to the welds between the products that make up the crown. The distribution of the variations in mass across the width of the tyre makes it possible to identify the product involved and attribute the appropriate density for calculating the corresponding variations in mass.

As a variant, the conversion module that converts said variations in thickness into variations in mass as a function of the mean density of said tyre may be externalized so as to be remote from the device.

On the basis of the variations in thickness it is thus possible to deduce the variations in mass of the crown of the tyre as a function of the densities of the products involved. Thus, all of the poorly-distributed masses in the tyre can be detected, and the irregular deformations of a tyre under the effect of centrifugal force at high speed can thus be anticipated, this being done using a characterization device comprising a tyre support set in rotation at low speed.

For example, the electronic control unit comprises a module for formulating a map of the variations in mass around the tyre on the basis of the information coming from the conversion module.

Thus, using this map, it is possible to make modifications to the tyre manufacturing method with a view to controlling or even eliminating these variations.

The measuring members are, for example, configured to measure at least the internal-surface geometry and the external-surface geometry at the crown of the tyre. In a variant, other measuring members could be provided for measuring the internal-surface geometry and the external-surface geometry of the tyre at other points on the tyre, for example the sidewalls.

The measuring members may be lasers, for example in a line or at a point, or else a sensor of the feeler gauge type comprising a strain gauge or any sensor capable of measuring or detecting the internal-surface geometry and the external-surface geometry of the tyre.

The rotary support may be driven in rotation manually or by a drive member, such as a motor for example.

For example, the device further comprises at least one block secured to the rotary support for centring the tyre.

The tyre is, for example, centred by at least one block secured to the rotary support. Three posts secured to the rotary support and situated on a circle more or less corresponding to the diameter of the rim of the tyre could, for example, be provided.

According to a second aspect, the invention relates to a method for characterizing a tyre in terms of uniformity, the crown of the tyre containing welded metal parts, wherein:
the tyre is placed on a rotary support of a tyre characterizing device,
the tyre and at least two measuring members of the device are brought closer together, for example the tyre may be positioned between the measuring members of said device, or the measuring members may be brought closer to the tyre.

According to the method, the rotary support is set in rotation at a low speed, for example less than or equal to 20 rpm, and the measuring members are used to measure, for each angular position of the rotary support, the internal-surface geometry and external-surface geometry of the tyre simultaneously as said rotary support rotates.

According to one embodiment, the variations in the distribution of thickness are determined for each point on the crown so as to determine the variations in mass of the tyre on the basis of the internal-geometry and external-geometry signals.

The two measuring members are positioned facing one another.

Advantageously, in order to determine the variations in the distribution of mass over the tyre, the variations in thickness for each angular position of said tyre, or of the rotary support, are determined, notably across the width of the crown of said tyre, on the basis of said internal-geometry and external-geometry signals, and said variations in thickness are converted into variations in mass as a function of a predetermined mean density of the tyre, a predetermined different density being applied when defects in the welds of the metal parts of the crown of the tyre are detected.

For example, a map of the variations in mass around the tyre is formulated on the basis of the determined variations in mass.

BRIEF DESCRIPTION OF THE FIGURES

Other objectives, features and advantages of the invention will become apparent on reading the following description, given solely by way of nonlimiting example and with reference to the appended drawings, in which.

DETAILED DESCRIPTION

Figure 1:
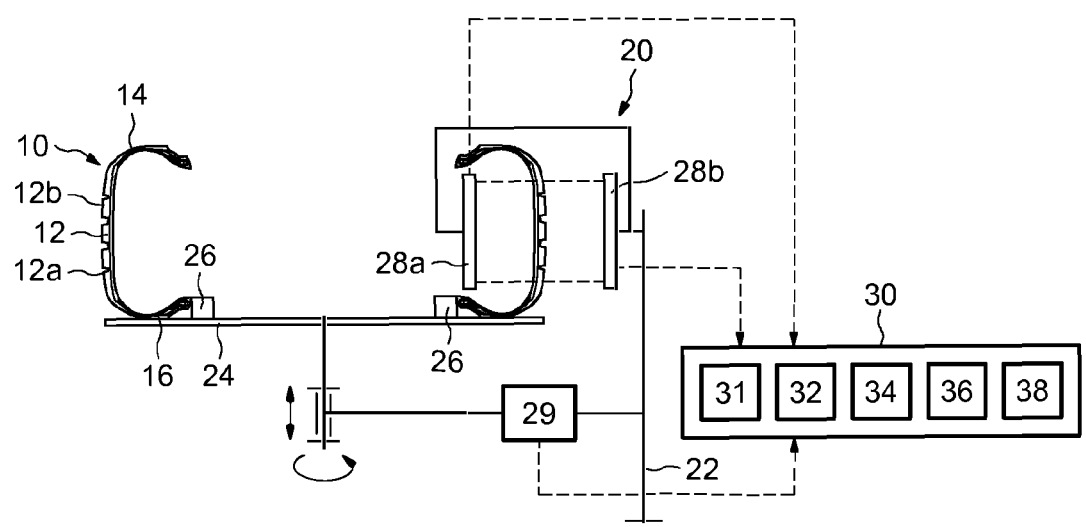
FIG. 1 schematically depicts a device for characterizing a tyre in terms of uniformity according to the invention.

FIG. 1 schematically depicts, in cross section, a tyre 10 comprising a tread 12 and two sidewalls 14, 16 surrounding the tread 12 on either side.

The tread comprises a tread surface intended to come into contact with a road surface when the wheel of the vehicle is running. The tyre 10 is intended to be mounted on a rim (not depicted).

The tread 12 comprises a plurality of incisions 12a delimiting blocks of rubber having edge corners 12b able to improve the grip of the tyre on the road surface.

A "tyre" means all types of resilient tread.

The "tread" of a tyre means a quantity of rubbery material delimited by lateral surfaces and by two main surfaces, of which one, referred to as the tread surface, is intended to come into contact with a road surface when the tyre is being driven on. The tread comprises a plurality of cuts extending over at least one of the surfaces.

A "rubbery material" means a diene elastomer, which is to say in a known manner an elastomer at least partially derived from diene monomers.

The "sidewall" of a tyre means a part of the lateral surface of the tyre that is disposed between the tread of the tyre and a bead of said tyre, starting from the ends of the cuts in the tread and extending as far as the bead.

A device for characterizing a tyre in terms of uniformity, referenced 20 overall, is configured to measure the differences in thickness of the tyre 10 and to deduce therefrom the irregularities in the distribution of mass notably in the crown of the tyre.

Specifically, the belting plies in the crown of the tyre generally contain welded metal parts, which amongst other things creates local overthicknesses.

To this end, the device 20 comprises a frame 22 and a support 24 for the tyre 10, mounted with the ability to rotate relative to the frame 22. The rotary support 24 may also be mounted with the ability to affect translational movement relative to said frame 22 in order to set the tyre 10 in position. A rotary support 24 that is fixed in terms of translational movement could be provided.

The uninflated tyre 10 is placed on the support 24. This makes it possible to avoid the time needed to fit/remove the tyre on/from a rim. The support 24 can be likened to a flat plate. The tyre can be set in place quickly without the need for precise centring on the plate and without any risk of the tyre being ejected as a result of centrifugal force, since the support 24 is driven at low speed. The flat receiving surface of the support 24 is intended to accept one of the sidewalls 16 or 14 of the tyre. The flat receiving surface of the support 24 is formed by the upper surface of the support. The tyre sidewall 16 or 14 resting on the flat receiving surface is the only part of the tyre to be in contact with the support 24. This also offers the advantage of having precise access to the internal surface of the tyre. In addition, because the tyre 10 is static relative to the rotary support rather than being directly driven in rotation, there is no risk of the tyre deforming as the rotary support 24 rotates at low speed. The rotary support 24 may be driven in rotation manually or by a drive member, (not depicted) such as a motor for example.

What is meant by "low speed" is a rotational speed of the rotary support 24 that is less than or equal to around 20 rpm.

As illustrated, the device 20 comprises two blocks or end-stops 26 secured to the rotary support 24 for centring the tyre 10 that is to be characterized. For example, the device 20 comprises three posts. In a variant, it is possible for these blocks 26 not to be provided, given that the support 24 is driven at a low speed.

The device 20 further comprises a measuring member 29 for measuring the angular position of the rotary support 24 which is secured to the frame 22. The measuring member that measures the angular position of the rotary support 24 may, for example, be an encoder configured to read an angular reference, such as, for example, a barcode inscribed on the tyre. The encoder 29 is fixed, by way of nonlimiting example, under the rotary support 24.

As illustrated, the device 20 further comprises two measuring members 28a, 28b secured to the frame 22 and configured to measure the surface geometry of the tyre that is to be characterized.

The two measuring members 28a, 28b are positioned respectively in such a way as to measure, for each angular position of the rotary support 24, the internal-surface geometry and the external-surface geometry of the tyre 10 simultaneously as the rotary support 24 rotates. The two measuring members 28a, 28b are notably placed facing one another. The measuring members 28a, 28b are configured to measure at least the internal-surface geometry and the external-surface geometry of the tyre 10 at the crown of the tyre 10. Other measuring members could be provided for measuring the internal-surface geometry and the external-surface geometry of the tyre 10 at other points on the tyre, for example the sidewalls 14, 16.

The measuring members 28a, 28b may be mounted with the ability to move translationally along the vertical axis of the device so that they can be brought closer to the rotary support 24 and notably to the tyre 10.

The measuring members 28a, 28b are, for example lasers, for example in a line or at a point, or else a sensor of the feeler gauge type comprising a strain gauge or any sensor capable of measuring the internal-surface geometry and the external-surface geometry of the tyre 10.

The device 20 comprises an electronic control unit 30 comprising an acquisition module 32 for acquiring the signals pertaining to the surface geometry of the tyre 10 coming from the measuring members 28a, 28b.

The electronic control unit 30 further comprises a module 34 for determining the thickness of the tyre and notably variations in thickness for each angular position of said tyre, on the basis of said internal-surface and external-surface geometry signals.

The electronic control unit 30 further comprises a module 36 for converting the variations in thickness for each angular position of said tyre into variations in mass as a function of a predetermined mean density of the tyre. The conversion module 36 may comprise one or more filters that make it possible to dispense with the tyre tread patterns.

The module 36 for example comprises a module for predetermining the mean density of the tyre. In particular, it comprises analysis means for linking the geometric measurements of a tyre to the model of the tyre or the serial number thereof, said tyre model being associated with a map of the density of the tyre. The geometric measurements include weld defects, which are for example detected using the measuring members 28a, 28b or an additional measuring member such as a laser.

In the case of the laser, the weld defects are detected for example by using a linear or scanning laser telemeter, a laser beam being projected continuously onto a surface of the tyre, said surface reflecting the light beam back. The housing of the laser telemeter receives the reflected beam and calculates the phase shift, which is linked to the travel time of the beam, between the emitting and the receiving of the beam so as to deduce the distance separating the telemeter from the tyre. If two laser telemeters are positioned one on each side of the tyre with their beams aligned on the same axis, all that is required is to know their separation and from this subtract the measurements taken by the telemeters in order to deduce irregularities in the tyre or weld defects. The weld defects are thus detected and grouped together in a weld defects map.

In addition, for each model of tyre there is associated a map of the density of a model of tyre, which map is accessible, for example, through a barcode on the tyre. The density map is a correlation between the density values of the semi-finished products that make up the tyre and the azimuthal position of each weld on each semi-finished product of the tyre. The semi-finished products are, for example, the layers of material used in the manufacture of the tyre.

The module 36 makes it possible, using the density-predetermining module, to link a map of the weld defects to the map of the density of the tyre, the location of each weld, visible in the density map, possibly giving rise to a weld defect, visible in the weld defects map.

In particular, certain welds are parallel to the axis of the tyre, or at an angle to this axis, giving rise to characteristic defects of the same kind.

The tyre 10 is made mainly of rubber and the mean density of rubber is comprised between 0.92 and 0.99. However, the crown of said tyre has a significantly higher density because of the incorporation of the metal parts. The conversion module 36 is configured to detect these weld defects and apply a different density, for example comprised between 3 and 5, to these. The electronic control unit 30 comprises a module 38 for formulating a map of the variations in mass around the tyre on the basis of the information coming from the conversion module 36.

Thus, using this map, it is possible to make modifications to the tyre manufacturing method with a view to controlling or even eliminating these variations.

The device for characterizing a tyre in terms of uniformity thus makes it possible to detect all of the poorly distributed masses in the tyre.

Figure 2:
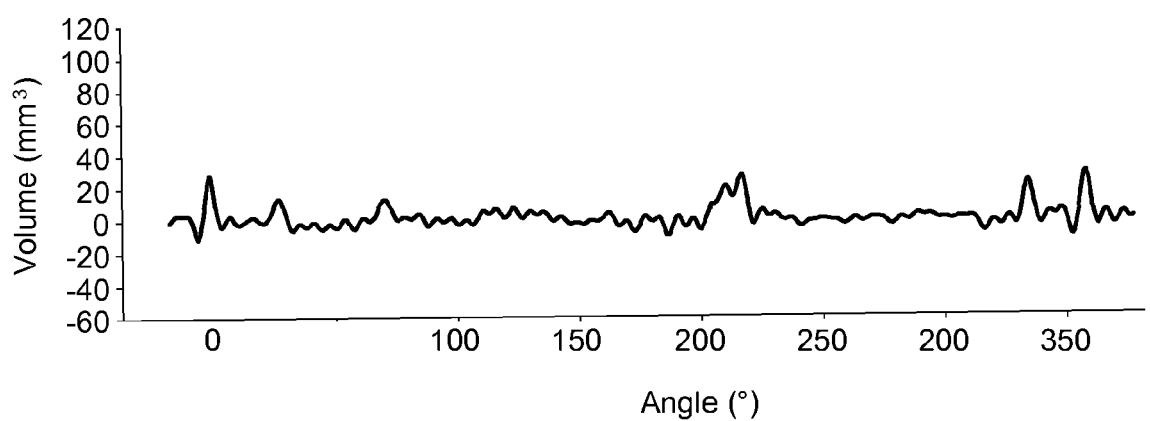
FIG. 2 shows a curve illustrating the profile for the variation in volume with respect to the angular position of the tyre originating from the module for determining the variations in thickness in the device of FIG. 1.

FIG. 2 illustrates a graph with, on the abscissa axis, the angular position of the tyre 10 in ° and, on the ordinate axis, the volume of the tyre in mm$^3$. The graph illustrates the profile for the variations in volume with respect to the angular position of the tyre originating from the module 34 for determining the variations in thickness in the device of FIG. 1. The profile obtained shows the presence of poorly distributed masses, indicated by spikes.

Figure 3:
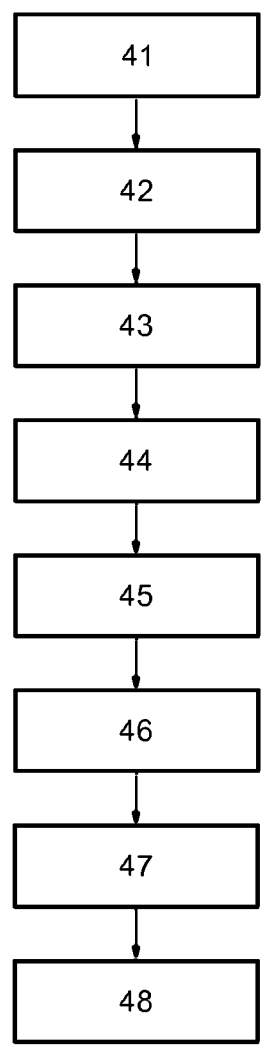
FIG. 3 illustrates the steps of a method for characterizing a tyre in terms of uniformity according to the invention, implemented by the device of FIG. 1.

FIG. 3 depicts a flow diagram for the implementation of a method 40 for characterizing a tyre in terms of uniformity.

The method 40 makes it possible to measure the variations in thickness of the tyre 10 and to deduce therefrom the irregularities in the distribution of mass notably in the crown of the tyre.

During a first step 41 the tyre 10 is placed on the rotary support 24 and then, in step 42, said rotary support 24 is made to effect a translational movement relative to the frame so as to position the tyre, and notably the crown thereof, between the geometric-measuring members 26a, 26b.

In step 43, the rotary support 24 is set in rotation at a low speed, for example less than or equal to approximately 20 rpm.

The measuring members 28a, 28b, in step 24, measure the internal-surface geometry and the external-surface geometry of the tyre 10 simultaneously as the rotary support 24 rotates at low speed.

Step 45 involves retrieving signals pertaining to the internal-surface geometry and external-surface geometry of the tyre 10 and originating from the measuring members 28a, 28b and the angular position of the rotary support 24 captured by an encoder 29 secured to the frame 22.

The thickness of the tyre and notably the variations in thickness for each angular position of said tyre are then determined, in step 46, on the basis of said internal-surface and external-surface geometry signals.

Said variations in thickness for each angular position of the rotary support 24 are then converted, in step 47, into variations in mass as a function of a predetermined mean density of the tyre, and then in step 48 a map of the variations in mass around the tyre is formulated from the variations in mass.

The device and the method for characterizing a tyre in terms of uniformity thus make it possible to detect all of the poorly distributed masses in the tyre.

The dynamic behaviour of the tyre therefore corresponds to the response of said tyre to the defects in geometry that are recorded at low speed and to the additional defects that are caused by the poorly distributed masses.

Thus, the irregular deformations of a tyre under the effect of centrifugal force at high speed can be anticipated, this being done using a characterization device comprising a tyre support set in rotation at low speed.

The invention claimed is:

1. A device for characterizing a tire in terms of uniformity, the crown of the tire containing welded metal parts, the device comprising:
   a frame;
   a rotary support mounted with the ability to rotate relative to the frame and intended to accept the tire that is to be characterized;
   a measuring member for measuring an angular position of the rotary support which is secured to the frame;
   at least two measuring members secured to the frame and positioned respectively in such a way as to measure, for each angular position of the rotary support, an internal-surface geometry and an external-surface geometry of the tire simultaneously as the rotary support rotates; and
   an electronic control unit comprising an acquisition module for acquiring internal-surface and external-surface geometry signals pertaining to the surface geometry of the tire coming from the measuring members,
   wherein the electronic control unit-comprises a module for determining thickness variations of the tire for each angular position of the rotary support on the basis of the internal-surface and external-surface geometry signals, and a module for converting the thickness variations into variations in mass as a function of a predetermined mean density of the tire, the conversion module being configured to detect defects in welds of the metal parts of the crown of the tire and apply a predetermined different density to the defects, and
   wherein the conversion module comprises analysis means for linking geometric measurements of a model of the tire or a serial number of the tire, the tire model or serial number being associated with a density map of the tire, the density map being a correlation between density values of semi-finished products that make up the tire and an azimuthal position of each weld on each semi-finished product that makes up the tire.

2. The device according to claim 1, wherein the electronic control unit comprises a module for formulating a map of the variations in mass around the tire on the basis of information coming from the conversion module.

3. The device according to claim 1, wherein the measuring members are configured to measure at least the internal-surface geometry and the external-surface geometry at the crown of the tire.

4. The device according to claim 1, wherein the measuring members comprise lasers.

5. The device according to claim 1, further comprising at least one block secured to the rotary support for centering the tire.

6. A method for characterizing a tire in terms of uniformity, the crown of the tire containing welded metal parts, the method comprising:
   placing the tire that is to be characterized on a rotary support of a tire characterizing device;
   bringing the tire and at least two measuring members of the device close together;
   rotating the rotary support at a speed less than or equal to 20 rpm; and
   measuring, using the measuring members, for each angular position of the rotary support, an internal-surface geometry and an external-surface geometry of the tire simultaneously as the rotary support rotates,
   wherein variations in a distribution of mass over the tire are determined by determining variations in thickness for each angular position of the tire on the basis of internal-geometry and external-geometry signals and by converting the variations in thickness into variations in mass as a function of a predetermined mean density of the tire, a predetermined different density being applied when defects in welds of the metal parts of the crown of the tire are detected, and
   wherein the converting includes analysis which links geometric measurements of a model of the tire or a serial number of the tire, the tire model or serial number being associated with a density map of the tire, the density map being a correlation between density values of semi-finished products that make up the tire and an azimuthal position of each weld on each semi-finished product that makes up the tire.

7. The method according to claim 6, wherein a map of the variations in mass around the tire is formulated on the basis of the determined variations in mass.

* * * * *